US010229523B2

(12) United States Patent
Sheaffer et al.

(10) Patent No.: US 10,229,523 B2
(45) Date of Patent: *Mar. 12, 2019

(54) AUGMENTED REALITY ALTERATION DETECTOR

(71) Applicant: EMPIRE TECHNOLOGY DEVELOPMENT LLC, Wilmington, DE (US)

(72) Inventors: Gad S. Sheaffer, Haifa (IL); Shmuel Ur, Galil (IL); Shay Bushinsky, Ganei Tikva (IL); Vlad Grigore Dabija, Mountain View, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,784

(22) Filed: Apr. 3, 2017

(65) Prior Publication Data

US 2017/0206692 A1    Jul. 20, 2017

Related U.S. Application Data

(63) Continuation of application No. 14/358,056, filed as application No. PCT/US2013/058758 on Sep. 9, 2013, now Pat. No. 9,626,773.

(51) Int. Cl.
*G06T 11/60* (2006.01)
*B60Q 9/00* (2006.01)
(Continued)

(52) U.S. Cl.
CPC .............. *G06T 11/60* (2013.01); *B60Q 9/008* (2013.01); *G02B 27/0093* (2013.01);
(Continued)

(58) Field of Classification Search
CPC .................................................... G06T 19/006
See application file for complete search history.

(56) References Cited

U.S. PATENT DOCUMENTS 8,502,835 B1    8/2013  Meehan
8,881,059 B2    11/2014  Adachi
(Continued)

FOREIGN PATENT DOCUMENTS

JP    2009169622 A    7/2009
KR    20110022274 A    3/2011
(Continued)

OTHER PUBLICATIONS

"Augmented reality," accessed at http://web.archive.org/web/20130812070133/http://en.wikipedia.org/wiki/Augmented_reality, last modified on Jul. 30, 2013, pp. 1-14.
(Continued)

*Primary Examiner* — Jeffery A Brier

(57) ABSTRACT

Technologies are generally described for systems and methods effective to detect an alteration in augmented reality. A processor may receive a real image that corresponds to a real object and may receive augmented reality instructions to generate a virtual object. The processor may determine that the virtual object at least partially obscures the real object when the virtual object is rendered on a display. The processor may, upon determining that the virtual object at least partially obscures the real object when the virtual object is rendered on the display, simulate an activity on the real object to produce a first activity simulation and simulate the activity on the virtual object to produce a second activity simulation. The processor may determine a difference between the first and the second activity simulation and
(Continued)

modify the augmented reality instructions to generate a modified virtual object in response to the determination of the difference.

20 Claims, 7 Drawing Sheets

(51) Int. Cl.
*G06F 3/01* (2006.01)
*G02B 27/00* (2006.01)
*G02B 27/01* (2006.01)

(52) U.S. Cl.
CPC ..... *G02B 27/0101* (2013.01); *G02B 27/0172* (2013.01); *G06F 3/013* (2013.01); *G02B 2027/014* (2013.01); *G02B 2027/0138* (2013.01); *G02B 2027/0178* (2013.01)

(56) References Cited

U.S. PATENT DOCUMENTS

| | | |
|---|---|---|
| 2004/0109009 A1 | 6/2004 | Yonezawa et al. |
| 2007/0202472 A1 | 8/2007 | Moritz |
| 2010/0321389 A1 | 12/2010 | Gay et al. |
| 2011/0313779 A1 | 12/2011 | Herzog et al. |
| 2011/0316845 A1 | 12/2011 | Roberts et al. |
| 2012/0235887 A1 | 9/2012 | Border et al. |
| 2012/0249590 A1 | 10/2012 | Maciocci et al. |
| 2013/0031551 A1 | 1/2013 | Agarwal et al. |
| 2013/0080046 A1 | 3/2013 | Jeong et al. |
| 2013/0286004 A1 | 10/2013 | McCulloch et al. |
| 2014/0098129 A1 | 4/2014 | Fein et al. |
| 2014/0354684 A1 | 12/2014 | Beckwith et al. |

FOREIGN PATENT DOCUMENTS

| | | |
|---|---|---|
| WO | 2012124250 A1 | 9/2012 |
| WO | 2012173602 A1 | 12/2012 |

OTHER PUBLICATIONS

"Driver Follows SatNav Directions Straight Into River," accessed at http://web.archive.org/web/20120623003552/http://www.shortnews.com/start.cfm?id=70240, Apr. 24, 2008, pp. 1-3.

George, P., et al., "DAARIA: Driver Assistance by Augmented Reality for Intelligent Automotive ," IEEE Intelligent Vehicles Symposium (IV), pp. 1043-1048 (2012).

International Search Report with Written Opinion for International Application No. PCT/US2013/058758 dated Mar. 18, 2014, pp. 8.

Owano, N., "Word Lens—augmented reality translation app—jumps platforms, is now on Android," accessed at http://web.archive.org/web/20130124130108/http://phys.org/news/2012-07-word-lens-augmented-reality.html, Jul. 19, 2012, pp. 1-7.

Tönnis, M., et al., "Experimental Evaluation of an Augmented Reality Visualization for Directing a Car Driver's Attention," Proceedings of the IEEE International Symposium on Mixed and Augmented Reality, pp. 1-4 (2005).

Vlaming, A.D., et al., "Augmented reality used in navigation," Project 2, Theme: improvement and innovation, Version: 1.5, pp. 1-25 (Feb. 5, 2013).

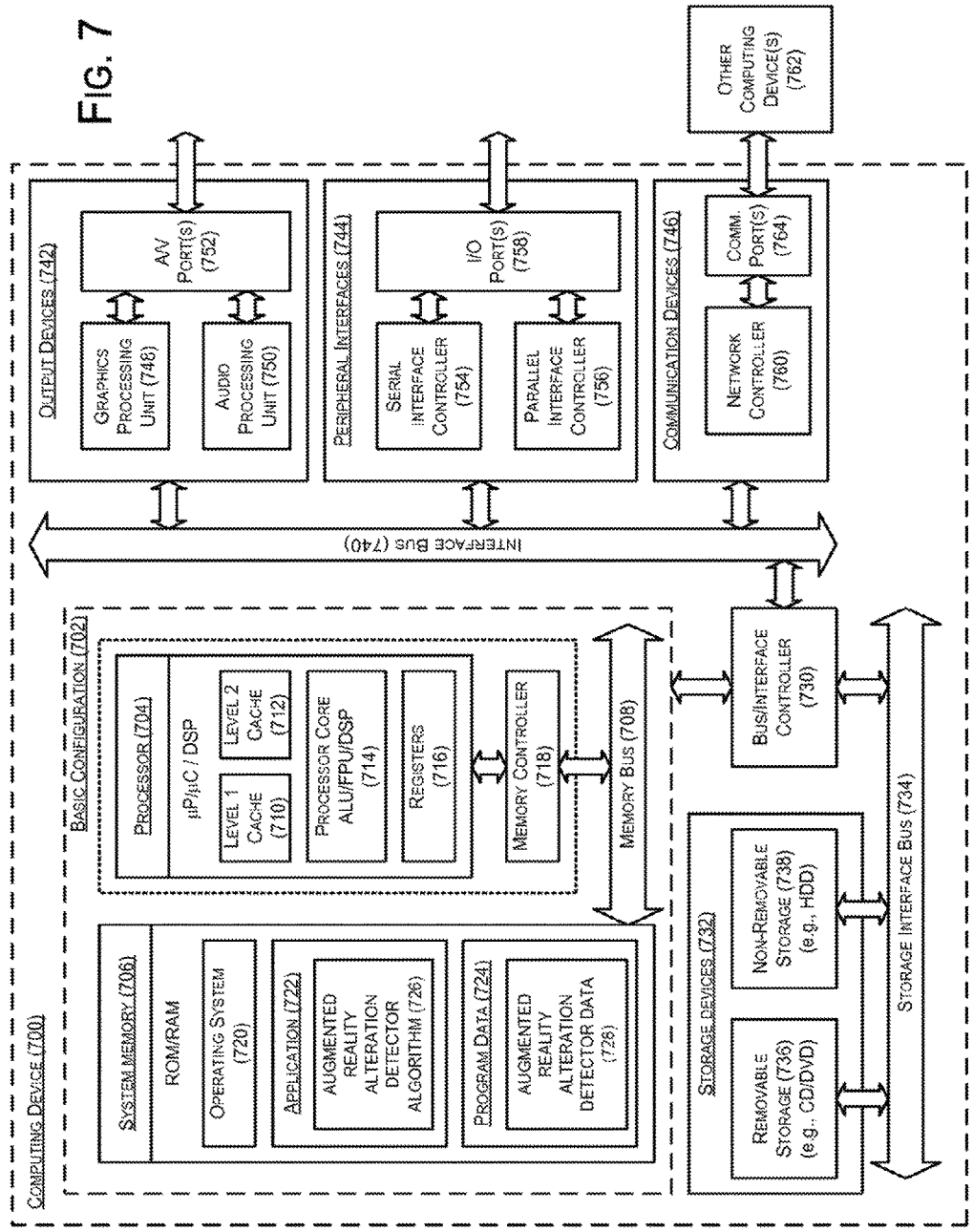

AUGMENTED REALITY ALTERATION DETECTOR

CROSS REFERENCE TO RELATED APPLICATIONS

The present application is a continuation application under 35 U.S.C. § 120 of U.S. application Ser. No. 14/358,056, filed on May 14, 2014, entitled "AUGMENTED REALITY ALTERATION DETECTOR," which in turn is a U.S. National Stage filing under 35 U.S.C. § 371 of International Application No. PCT/US13/58758, filed on Sep. 9, 2013, entitled "AUGMENTED REALITY ALTERATION DETECTOR." U.S. application Ser. No. 14/358,056 and International Application No. PCT/US13/58758, including any appendices or attachments thereof, are hereby incorporated by reference in their entirety.

BACKGROUND

Unless otherwise indicated herein, the materials described in this section are not prior art to the claims in this application and are not admitted to be prior art by inclusion in this section.

In an augmented reality system, a user's view of the real world is enhanced. Through a display provided to the user, the user may see virtual objects placed onto real objects in a scene of interest. Additionally, virtual information may be added about real objects and displayed on the display.

SUMMARY

In an example, methods for detecting an alteration in augmented reality are generally described. The methods may include, by a processor, receiving a real image that corresponds to a real object. The methods may include receiving augmented reality instructions to generate a virtual object. The methods may include determining that the virtual object at least partially obscures the real object when the virtual object is rendered on a display. The methods may include, upon determining that the virtual object at least partially obscures the real object when the virtual object is rendered on the display, simulating an activity on the real object to produce a first activity simulation and simulating the activity on the virtual object to produce a second activity simulation. The methods may include determining a difference between the first and the second activity simulation. The methods may include modifying the augmented reality instructions to generate a modified virtual object in response to the determination of the difference.

In an example, devices effective to detect an alteration in augmented reality are generally described. The devices may include a camera effective to capture a real image that may correspond to a real object. The device may further include a display and a processor configured to be in communication with the camera and the display. The processor may be configured to receive the real image and receive augmented reality instructions to generate a virtual object. The processor may be configured to determine that the virtual object at least partially obscures the real object upon rendering the virtual object on the display. The processor may be configured to, upon the determination that the virtual object at least partially obscures the real object when rendering the virtual object on the display, simulate an activity on the real object to produce a first activity simulation and simulate the activity on the virtual object to produce a second activity simulation. The processor may be configured to determine a difference between the first and the second activity simulation. The processor may modify the augmented reality instructions to generate a modified virtual object in response to the determination of the difference.

In an example, methods for detecting an alteration in augmented reality are generally described. The methods may include, by a processor, receiving a real image that corresponds to a real object. The methods may include receiving augmented reality instructions to generate a virtual object. The methods may include determining that the virtual object at least partially obscures the real object. The methods may include determining that the real object corresponds to an object in library. The methods may include modifying the augmented reality instructions to produce a modified virtual object in response to the determination that virtual object at least partially obscures the real object and that the real object corresponds to an object in the library.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a block diagram illustrating an example computing device that is arranged to implement an augmented reality alteration detector, all arranged in accordance with at least some embodiments presented herein.

DETAILED DESCRIPTION

Figure 1:
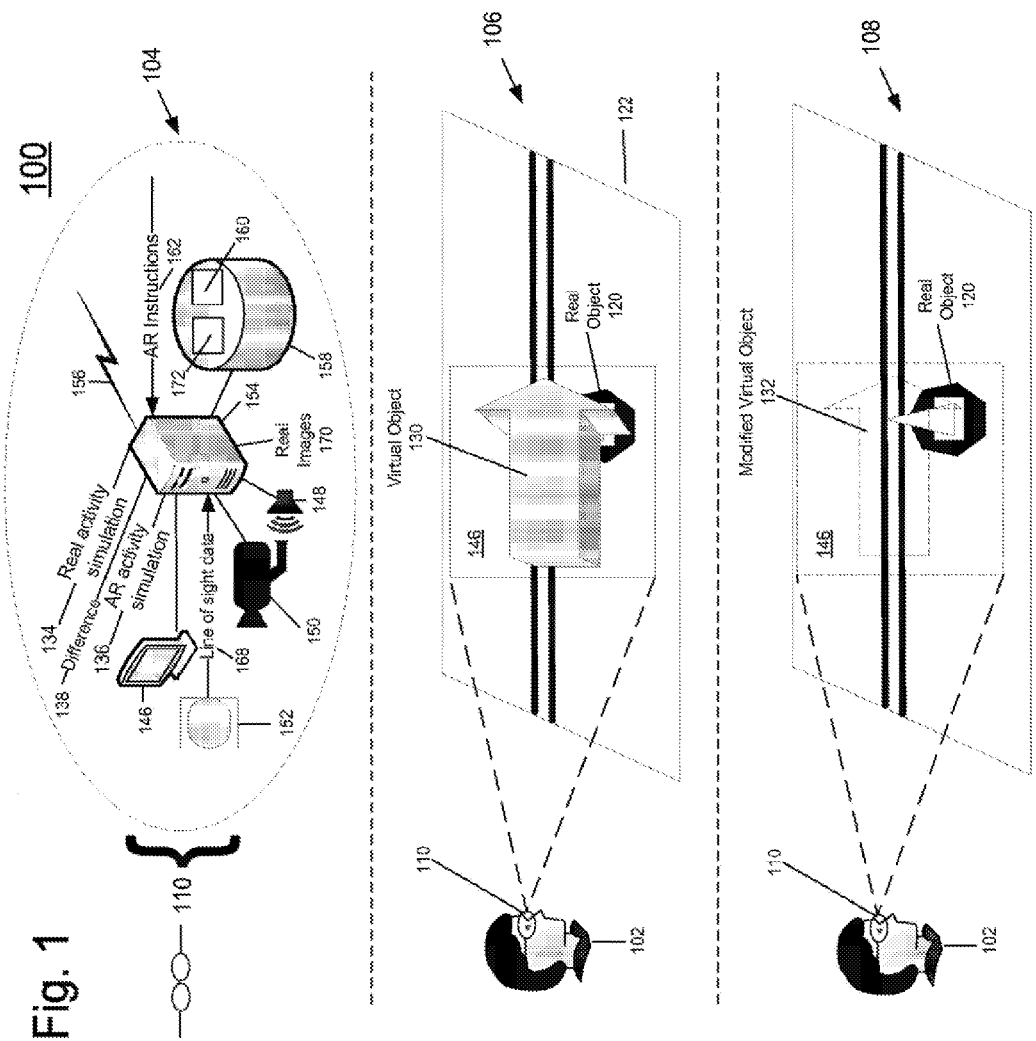
FIG. 1 illustrates an example system that can be utilized to implement an augmented reality alteration detector when the augmented reality display is a glasses device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure is generally drawn, inter alia, to technologies including methods, apparatus, systems, devices, and computer program products related to an augmented reality alteration detector.

Briefly stated, technologies are generally described for systems and methods effective to detect an alteration in augmented reality. A processor may receive a real image that corresponds to a real object and may receive augmented reality instructions to generate a virtual object. The processor may determine that the virtual object at least partially obscures the real object when the virtual object is rendered on a display. The processor may, upon determining that the virtual object at least partially obscures the real object when the virtual object is rendered on the display, simulate an activity on the real object to produce a first activity simulation and simulate the activity on the virtual object to produce a second activity simulation. The processor may determine a difference between the first and the second activity simulation and modify the augmented reality instructions to generate a modified virtual object in response to the determination of the difference.

FIG. 1 illustrates an example system 100 that can be utilized to implement an augmented reality alteration detector when the augmented reality display is a glasses device, arranged in accordance with at least some embodiments presented herein. System 100 may include an augmented reality device 110. As shown at 104, augmented reality ("AR") device 110 may include a processor 154 configured to be in communication with one or more of a display 146, a speaker 148, a camera 150, an eye tracking sensor 152 and/or a memory 158, such as by a communication link 156. Memory 158 may include instructions 160 and simulation software 172.

As described in more detail below, augmented reality device 110 may display virtual objects or other information relating to the surrounding environment to augment reality to viewer 102. Augmented reality device 110 may be a wearable AR device such as augmented reality glasses including GOOGLE GLASS.

Focusing also at 106, eye tracking sensor 152 on AR device 110 may determine a line of sight for a viewer 102 and generate and send line of sight data 168 to processor 154. A line of sight may include, for example, a cone or paraboloid with one end at a user's iris and another end extending from the iris. The line of sight may be unobstructed or partially obstructed. Processor 154 may receive line of sight data 168 and data from camera 150 and determine real images 170 within the line of sight. Real images 170 determined by processor 154 may correspond to a real object 120. Real object 120 may be at a location in a field of view 122.

Processor 154 may receive augmented reality instructions 162. Augmented reality instructions may enhance or alter real images 170 by adding one or more virtual objects 130. In response to AR instructions 162, processor 154 may generate virtual object 130 on display 146. Viewer 102, may, by viewing display 146 of augmented reality device 110, see virtual object 130 in field of view 122. Processor 154 may determine that virtual object 130 obscures or at least partially covers up real object 120 when rendered on display 146. Real object 120 may include important information about the surroundings and environment related to viewer 102. Viewer 102 may not see important information from or regarding real object 120 in field of view 122 because the information may be obscured by virtual object 130. As a consequence, viewer 102 may be exposed to a potential risk of harm if, for example, the information obscured was a tripping hazard, a missing safety railing, or a downed power line.

Processor 154 may execute simulation software 172. Simulation software 172 may relate to an activity that viewer 102 is performing. Simulation software 172 may, for example, simulate activities of viewer 102 such as walking or driving. Simulation software 172 may include facial recognition software. In one example, simulation software 172 may analyze real images 170 that may correspond to real object 120. Simulation software 172 may simulate an activity of viewer 102 in response to viewing real object 120 to produce real activity simulation 134. Processor 154 may also execute simulation software 172 to simulate an activity of viewer 102 in response to viewing virtual object 130 to produce AR activity simulation 136. Processor 154 may compare real activity simulation 134 with AR activity simulation 136 and may determine a difference 138 between AR activity simulation 136 and real activity simulation 134. A difference may be determined when real activity simulation 134 and AR activity simulation 136 are not equivalent such as when different instructions are produced by the simulations. For example, a difference may be determined when a user walks around a real tree in real activity simulation 134 but walks through what appears to be an absence of a tree in AR activity simulation 136.

Processor 154 may, by executing instructions 160, periodically compare real activity simulation 134 with AR activity simulation 136 and may determine difference 138. A determination of substantially no difference between AR activity simulation 136 and real activity simulation 134 may indicate that AR instructions 162 and virtual object 130 may not cause a change in viewer 102 activity. In an example, real activity simulation 134 and AR activity simulation 136 may both produce driving instructions and AR instructions may relate to generating flowers or scenery on a road. In this example, driving instructions from real activity simulation 134 would be substantially not different from driving instructions from AR activity simulation 136.

A difference between AR activity simulation 136 and real activity simulation 134 may indicate that AR instructions 162 and virtual object 130 may cause a change in viewer 102 activity. A change in viewer 102 activity may indicate an increased risk of harm to viewer 102 when performing activities while viewing virtual image 130 based on AR instructions 162.

As shown at 108, in response to determining difference 138, processor 154 may emphasize the augmented reality alteration to viewer 102 by modifying augmented reality instructions 162 to produce modified virtual object 132. Examples of modifying augmented reality instructions 162 may include: stopping rendering of virtual object 130, decreasing a size of virtual object 130 so that virtual object 130 does not interfere with real object 120, flashing virtual object 130 such as prior to stopping rendering or decreasing the size of virtual object 130, imaging virtual object 130 as transparent, highlighting virtual object 130, etc. Processor 154 may also generate an audio alarm through speaker 148 in conjunction with any method of modifying augmented reality instructions 162 to further alert viewer 102 to a possible risk.

In one example, a viewer 102 may be wearing an augmented reality device 110 while driving down a street. AR device 110 may be providing travel directions to viewer 102. As depicted at 106, processor 154 executing AR instructions 162 may generate virtual object 130 (a large arrow) on AR device display 146 for viewer 102 to follow. Virtual object 130 may obscure real object 120 from viewer 102 when rendered on display 146. Processor 154 may execute simulation software 172 that relates to viewer 102 driving. Simulation software 172 may use real images 170 to produce real activity simulation 134. Real activity simulation 134 may depict viewer 102 driving to avoid real object 120. Real object 120 may be a safety cone in a pothole as shown at 108.

Processor 154 may execute simulation software 172 to simulate viewer 102 driving in response to viewing virtual object 130 to produce AR activity simulation 136. AR activity simulation 136 may depict viewer 102 driving straight to follow virtual object 130 and through real object 120.

Processer 154 may determine a difference between AR activity simulation 136 and real activity simulation 134. At 108, in response to determining the difference, processor 154 may emphasize the augmented reality alteration to viewer 102 by modifying augmented reality instructions 162 to generate modified virtual object 132. Modified virtual object 132 may be a transparent representation of virtual object 130 on display 146. Modifying augmented reality instructions 162 to generate a transparent representation of virtual object 130 prevents modified virtual object 132 from obscuring real object 120 from viewer 102. Viewer 102 may alter driving in response to seeing real object 120 such as avoiding real object 120.

Figure 2:
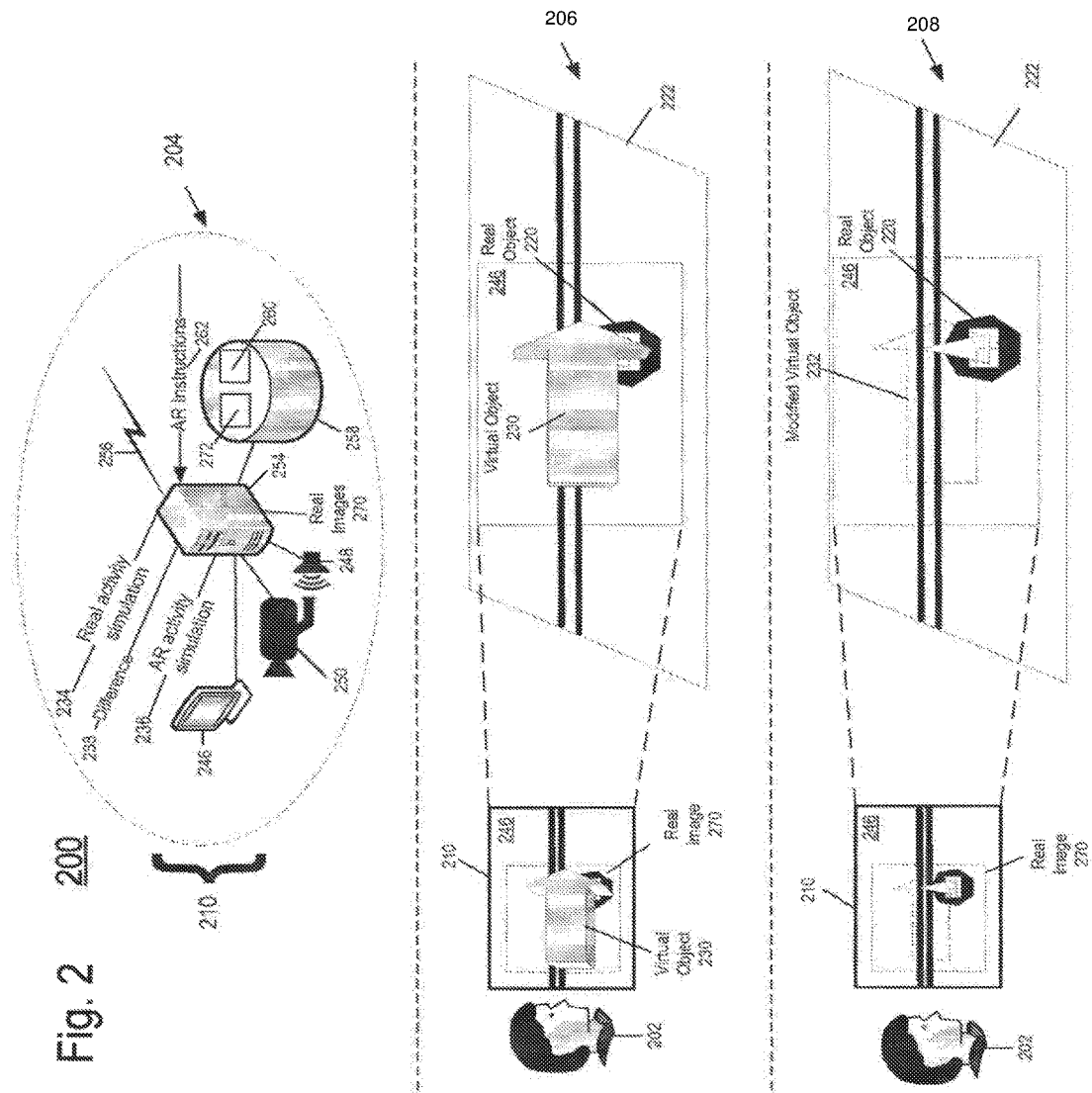
FIG. 2 illustrates an example system that can be utilized to implement an augmented reality alteration detector when the augmented reality display is a screen.

FIG. 2 illustrates an example system 200 that can be utilized to implement an augmented reality alteration detector when the augmented reality display is a screen arranged in accordance with at least some embodiments presented herein. System 200 may include an augmented reality device 210. As shown at 204, AR device 210 may include a processor 254 configured to be in communication with one or more of a display 246, a speaker 248, a camera 250 and/or a memory 258, such as by a communication link 256. Memory 258 may include instructions 260 and simulation software 272.

As described in more detail below, AR device 210 may display virtual objects or other information to augment reality to viewer 202 in a field of view 222. Augmented reality device 210 may be a portable screen AR device such as a tablet device, cellular phone, laptop or other device that may be held and viewed.

Focusing also at 206, processor 254 may receive real images 270 from camera 250. Real images 270 may correspond to real objects including real object 220. Processor 254 may receive AR instructions 262. AR instructions 262 may enhance or alter real images 270 by adding one or more virtual objects 230. In response to AR instructions 262, processor 254 may generate virtual image 230 obscuring or at least partially covering up real images 270 on display 246. Viewer 202, may, by viewing display 246 of augmented reality device 210, see virtual object 230 over real images 270. Processor 254 may determine that virtual object 230, rendered on display 246 obscures or at least partially covers up a real image 270 correspond to real object 220. Real object 220 may include important information about the surroundings and environment related to viewer 202. Viewer 202 may not see important information from real object 220 because the information may be obscured by virtual object 230. As a consequence, viewer 202 may be exposed to a potential risk of harm.

Processor 254 may execute simulation software 272. Simulation software 272 may pertain to an activity that viewer 202 is performing. In one example, simulation software 272 may analyze real images 270, and simulate an activity of viewer 202 in response to encountering real object 220 to produce a real activity simulation 234. Processor 254 may also execute simulation software 272 pertaining to the activity viewer 202 is performing using real images 270, AR instructions 262, and virtual object 230. Simulation software 272 may simulate an activity of viewer 202 in response to encountering virtual object 230 to produce an AR activity simulation 236. Processor 254 may compare real activity simulation 234 with AR activity simulation 236 and may determine a difference 238 between AR activity simulation 236 and real activity simulation 234.

Processor 254 may, by executing instructions 260, periodically compare real activity simulation 234 with AR activity simulation 236 and may determine difference 238 between AR activity simulation 236 and real activity simulation 234. Processer 254 may determine when there is substantially no difference between AR activity simulation 236 and real activity simulation 234. A determination of substantially no difference may indicate that AR instructions 262 and virtual object 230 may not cause a change in viewer 202 activity.

Processer 254 may determine difference 238 between AR activity simulation 236 and real activity simulation 234. A difference may indicate that AR instructions 262 and virtual object 230 may cause a change in viewer 202 activity. A change in viewer 202 activity may indicate an increased risk of harm to viewer 202.

At 208, in response to determining difference 238, processor 254 may emphasize the augmented reality alteration to viewer 202 by modifying augmented reality instructions 262 to produce modified virtual object 232. Examples of modifying augmented reality instructions 262 may include stopping rendering of virtual object 230, decreasing the size of virtual object 230 so virtual object 230 does not interfere with real object 220, flashing virtual object 230 prior to not rendering or decreasing size, imaging virtual object 230 as transparent, highlighting virtual object 230, etc. Processor 254 may also sound an audio alarm through speaker 248 in conjunction with any method of modifying augmented reality instructions 262 to further alert viewer 202 to a possible risk.

In an example, at 206 in FIG. 2, a viewer 202 is viewing an AR device 210. The AR device 210 may be a mobile phone and may be providing directions to a destination by displaying virtual object (arrow) 230 over real images 270 on display 246 to be followed by viewer 202. Virtual object 230 may cover up or obscure real image 270 when rendered on display 246. Viewer 202, viewing display 246, may not see real image 270 covered up by virtual object 230.

Processor 254 may execute simulation software 272 that relates to an activity of walking. Simulation software 272 may use real images 270 to provide real activity simulation 234. Real activity simulation 234 may depict viewer 202 walking around real object 220. Real object 220 may be a safety cone in a pothole as shown at 208.

Processor 254, may execute simulation software 272 to simulate viewer 202 walking in response to viewing virtual object 230 to produce AR activity simulation 236. AR activity simulation 236 may depict viewer 202 walking straight through real object 220 to follow virtual object 230.

Processer 254 may determine a difference 238 between AR activity simulation 236 and real activity simulation 234. At 208, in response to determining difference 238, processor 254 may emphasize the augmented reality alteration to viewer 202 by modifying augmented reality instructions 262 to generate modified virtual object 232. Modifying augmented reality instructions 262 to generate a transparent representation of virtual object 230 prevents modified virtual object 232 from obscuring real object 220 from viewer 202. Viewer 202 may alter walking in response to seeing real image 270 such as avoiding real object 220.

Figure 3:
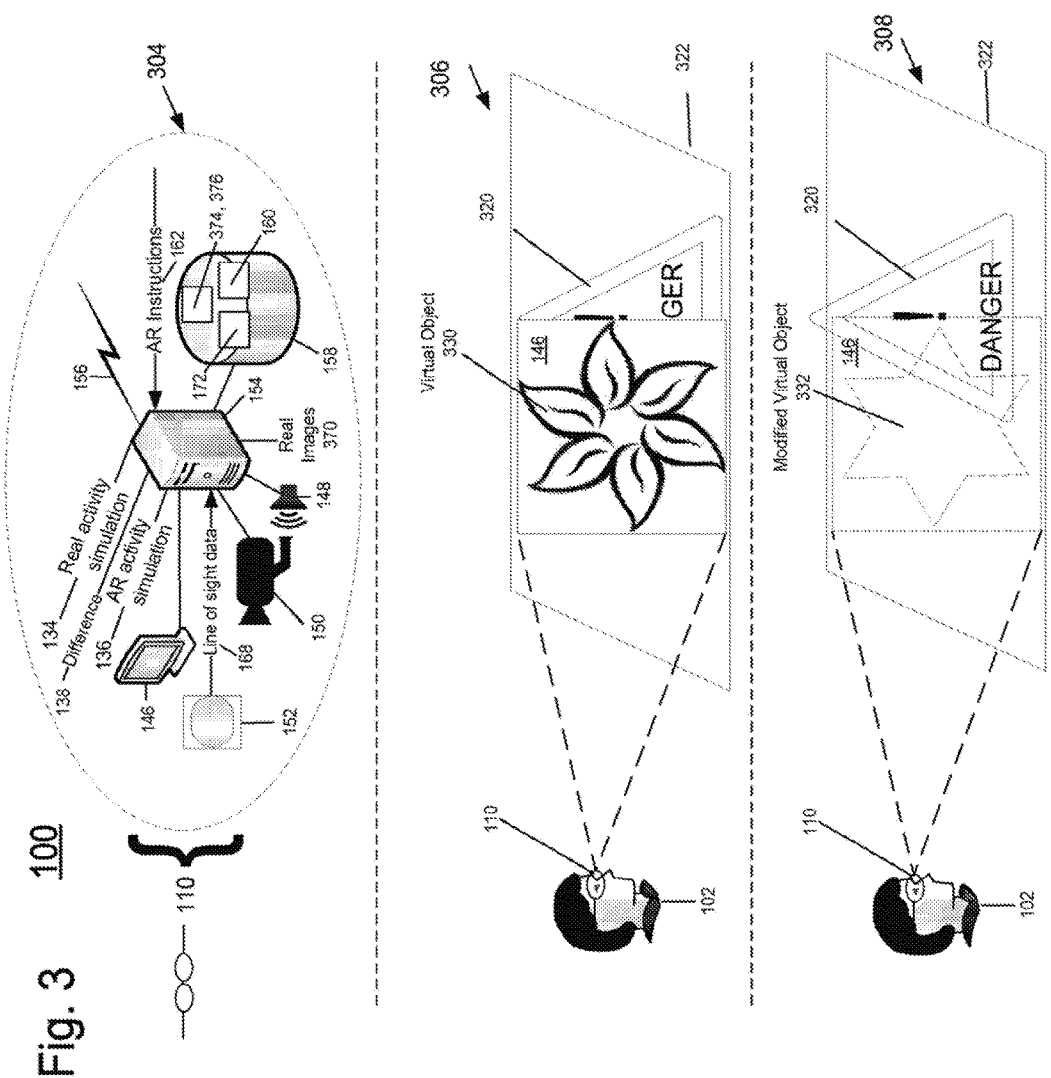
FIG. 3 illustrates the example system of FIG. 1 in an example where the real object corresponds to an object in a library.

FIG. 3 illustrates the example system 100 of FIG. 1 in an example where the real object corresponds to an object in a library arranged in accordance with at least some embodiments described herein. System 100 of FIG. 3 is substantially similar to FIG. 1, with additional details. Those components in FIG. 3 that are labeled identically to components of FIG. 1 will not be described again for the purposes of clarity.

As shown at 304, augmented reality device 110 may include memory 158. Memory 158 may further include recognition software 374. Recognition software 374 may include a recognition software library 376.

Focusing at 306, processor 154 may receive AR instructions 162. Augmented reality instructions 162 may enhance or alter real images 370 by adding one or more virtual objects 130. In response to AR instructions 162, processor 154 may render virtual object 330 on display 146. Viewer 102, may see virtual object 330 on display 146 in field of view 122. Processor 154 may determine that virtual object 330 obscures or at least partially covers up a real object 320. Real object 320 may include important information about the surroundings and environment related to viewer 102. Viewer 102 may not see important information from real object 320 in field of view 122 because the information may be obscured by virtual object 330. As a consequence, viewer 102 may be exposed to a potential risk of harm.

Processor 154 may execute recognition software 374. Recognition software 374 may compare objects in real images 370 with objects in recognition software library 376. Objects in recognition software library 376 may include signs identifying hazards such as hazardous ideograms. Recognition software library 176 may include foods or other allergens that viewer 102 may be allergic to, and/or faces. Processor 154, executing recognition software 374, may determine that an object in real image 370 corresponds to an object in recognition software library 376.

At 308, in response to determining that an object in real image 370 corresponds to an object in recognition software library 376, processor 154 may emphasize the augmented reality alteration to viewer 102 by modifying augmented reality instructions 162 to produce modified virtual object 332. Modified virtual object 332 may allow viewer 102 to see real object 320.

In an example, a viewer 102 wearing AR device 110 may be walking. AR device 110, executing AR instructions 162, may render virtual object 330 over real object 320. At 306, virtual object 330 is a wildflower displayed over real object 320, a danger sign. Viewer 102 may have an increased risk of harm due to not seeing real object 320—the danger sign. Processor 154 may determine that virtual object 330 at least partially obscures real object and that real object 320 corresponds to an object in recognition software library 376.

At 308, in response to determining that the real object corresponds to an object in recognition software library 376, processor 154 may modify augmented reality instructions 262 to produce modified virtual object 332—in the example, a transparent representation of virtual object 330. Modified virtual object 332 may allow viewer 102 to view real object 320 and view any pertinent information provided by real object 320.

Figure 4:
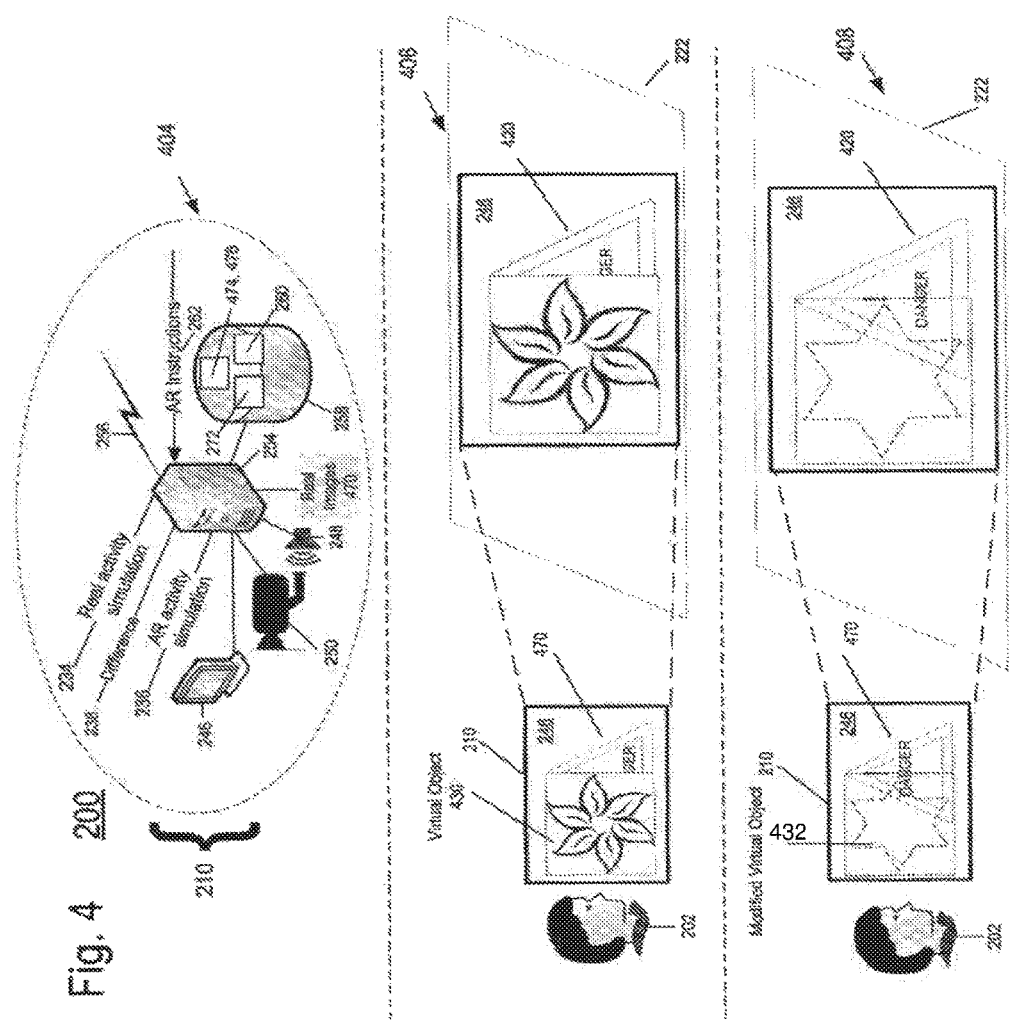
FIG. 4 illustrates the example system of FIG. 2 in an example where the real object corresponds to an object in a library.

FIG. 4 illustrates the example system 200 of FIG. 2 in an example where the real object corresponds to an object in a library arranged in accordance with at least some embodiments described herein. System 200 of FIG. 4 is substantially similar to FIG. 2, with additional details. Those components in FIG. 4 that are labeled identically to components of FIG. 2 will not be described again for the purposes of clarity.

As shown at 404, AR device 210 may include memory 258. Memory 258 may further include recognition software 474. Recognition software 474 may include a recognition software library 476.

Focusing at 406, processor 254 may receive real image 470 from camera 250. Real images 470 may correspond to real objects including real object 420. Processor 254 may receive AR instructions 262. Augmented reality instructions 262 may enhance or alter real images 470 corresponding to real objects 420 by adding one or more virtual objects 220. In response to AR instructions 262, processor 254 may render virtual object 430 on display 246. Viewer 202 may see virtual object 430 on display 246. Processor 254 may determine that virtual object 430 obscures or at least partially covers up a real image 470. Real object 420 may include important information about the surroundings and environment related to viewer 202. Viewer 202 may not see important information from real object 420 because the information may be obscured by virtual object 430. As a consequence, viewer 202 may be exposed to a potential risk of harm.

Processor 254 may execute recognition software 474. Recognition software 474 may compare objects in real images 270 with objects in recognition software library 476. Objects in recognition software library 476 may include signs that identify hazardous ideograms. Recognition software library 176 may include foods or other allergens that viewer 202 may be allergic to, and/or faces. Processor 254, executing recognition software 474 may determine that an object in real images 470 corresponds to an object in recognition software library 476.

At 408, in response to determining that an object in real image 470 corresponds to an object in recognition software library 476, processor 254 may emphasize the augmented reality alteration to viewer 202 by modifying augmented reality instructions 262 to produce modified virtual object 432. Modified virtual object 432 may allow viewer 202 to view real images 470 and view any pertinent information provided by real object 420.

In an example, a viewer 202, may be viewing an AR device 210. AR instructions 262 may be for a wildlife application. Viewer 202 may be hiking on a trail, with AR device 210 enhancing the experience by displaying virtual wildlife. Virtual wildlife may cover real images 470, which may correspond to poison ivy. Processor 254 may execute recognition software 474, which may include recognition software library 476. Poison ivy may be included in recognition software library 476. In response, processor 254 may emphasize the virtual object to viewer 202 such that viewer 202 is alerted to the presence of the poison ivy.

Among other possible benefits, a system in accordance with the present disclosure may be used to prevent an augmented reality alteration from putting a viewer at risk for harm. The augmented reality alteration may be emphasized to the viewer so that the viewers' activity may be influence by real world images and not the virtual reality images. Viewers that are engrossed in an augmented reality experience may be alerted to potential risks of harm. Viewers may not be required to "look up" from the screen of an AR device in order to know when an augmented reality alteration may affect an activity of the viewer.

A system in accordance with the present disclosure may provide a user having various allergies with alerts to potential allergens. Objects with allergens may be stored in a library. When those objects are obscured by virtual objects, a user may be alerted so that the user may be able to avoid allergens. A library in the memory may include facial recognition software including individual faces. A system in accordance to the present disclosure may be able to identify and emphasize a face to a viewer for further investigation.

Figure 5:
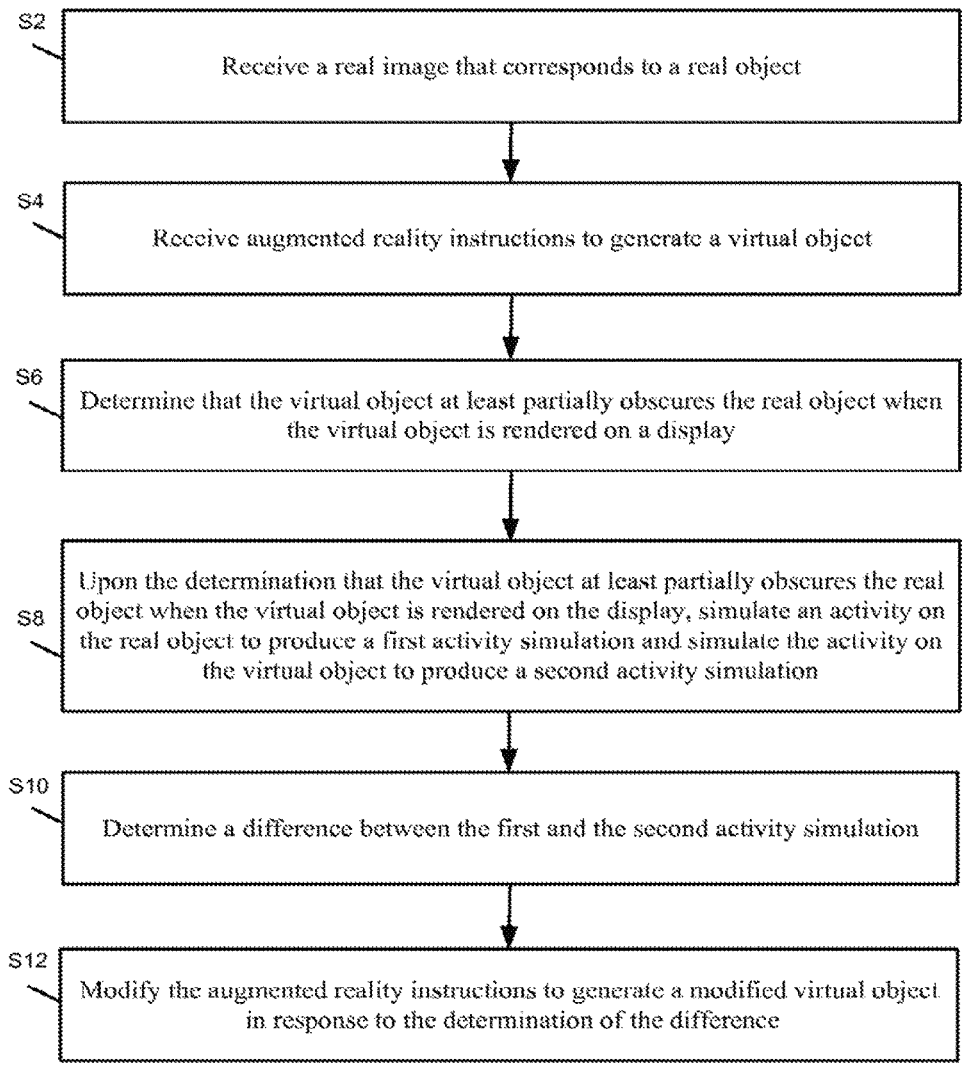
FIG. 5 illustrates a flow diagram illustrating an example process for implementing an augmented reality alteration detector.

FIG. 5 illustrates a flow diagram illustrating an example process for implementing an augmented reality alteration detector arranged in accordance with at least some embodiments presented herein. The process in FIG. 5 could be implemented using, for example, systems 100 or 200 discussed above. An example process may include one or more operations, actions, or functions as illustrated by one or more of blocks S2, S4, S6, S8, S10 and/or S12. Although illustrated as discrete blocks, various blocks may be divided into additional blocks, combined into fewer blocks, or eliminated, depending on the desired implementation.

Processing may begin at block S2, "Receive a real image that corresponds to a real object." At block S2, a processor within an AR device may receive a real image from a camera included in the AR device. The real image may correspond to a real object.

Processing may continue from block S2 to block S4, "Receive augmented reality instructions to generate a virtual object." At block S4, the processor may receive augmented reality instructions to generate a virtual object. The virtual object may be rendered on a display included in the AR device. The display may be viewed by a viewer of the AR device.

Processing may continue from block S4 to block S6, "Determine that the virtual object at least partially obscures the real object when the virtual object is rendered on a display." At block S6, the processor may determine that the virtual object at least partially obscures the real object when the virtual object is rendered on the display. The determination may be based on line of sight data. When the real object is at least partially obscured, the viewer of the AR device may not view information associated with the real object and may be at risk of harm.

Processing may continue from block S6 to block S8, "Upon the determination that the virtual object at least partially obscures the real object when the virtual object is rendered on the display, simulate an activity on the real object to produce a first activity simulation and simulate the activity on the virtual object to produce a second activity simulation." At block S8, the processor may, upon the determination that the virtual object at least partially obscures the real object when rendered on the display, simulate an activity on the real object to produce a first activity simulation and simulate the activity on the virtual object to produce a second activity simulation. Activities simulated may be activities such as walking or driving that the viewer of the AR device may be undertaking. The first activity simulation may simulate the activity of the viewer relating to an interaction with the real object, while the second activity simulation may simulate the activity of the viewer relating to an interaction with the virtual object.

In an example, a viewer of an AR device may be walking along a sidewalk. There may be a tree root sticking up out of the sidewalk. The viewer, viewing the AR device, may not view the tree root as the AR device may be generating a virtual image of a grassy meadow over the sidewalk. The processor in the AR device may determine that the virtual object of the grassy meadow obscures the real object of the tree root. The processor may generate a first simulation of walking when viewing the tree root and a second simulation of walking when viewing the grassy meadow.

Processing may continue from block S8 to block S10 "Determine a difference between the first and the second activity simulation." At block S10, the processor may determine a difference between the first activity simulation and the second activity simulation. The viewer using the augmented reality device may interact differently when viewing the real object than when viewing the virtual object.

Continuing the example of above, the first simulation of walking when viewing the tree root may simulate the viewer stepping over the tree root. The second simulation of walking when viewing the grassy meadow may simulate the viewer walking straight into the tree root. The processor may determine that the first simulation is different from the second simulation indicating that the virtual object affected the activity of the viewer.

Processing may continue from block S10 to block S12 "Modify the augmented reality instructions to generate a modified virtual object in response to the determination of the difference." At block S12, the processor may modify the augmented reality instructions to generate a modified virtual object in response to the determination of the difference between the first activity simulation and the second activity simulation.

The virtual object may be modified by stopping the rendering of the virtual object, decreasing a size of the virtual object so it does not interfere with the real object, flashing the virtual object such as prior to stopping the rendering or decreasing the size, imaging the virtual object as transparent, highlighting the virtual object, etc. The processor may also generate an audio alarm in conjunction with any method of modifying the virtual object to further alert the viewer to a possible risk.

Figure 6:
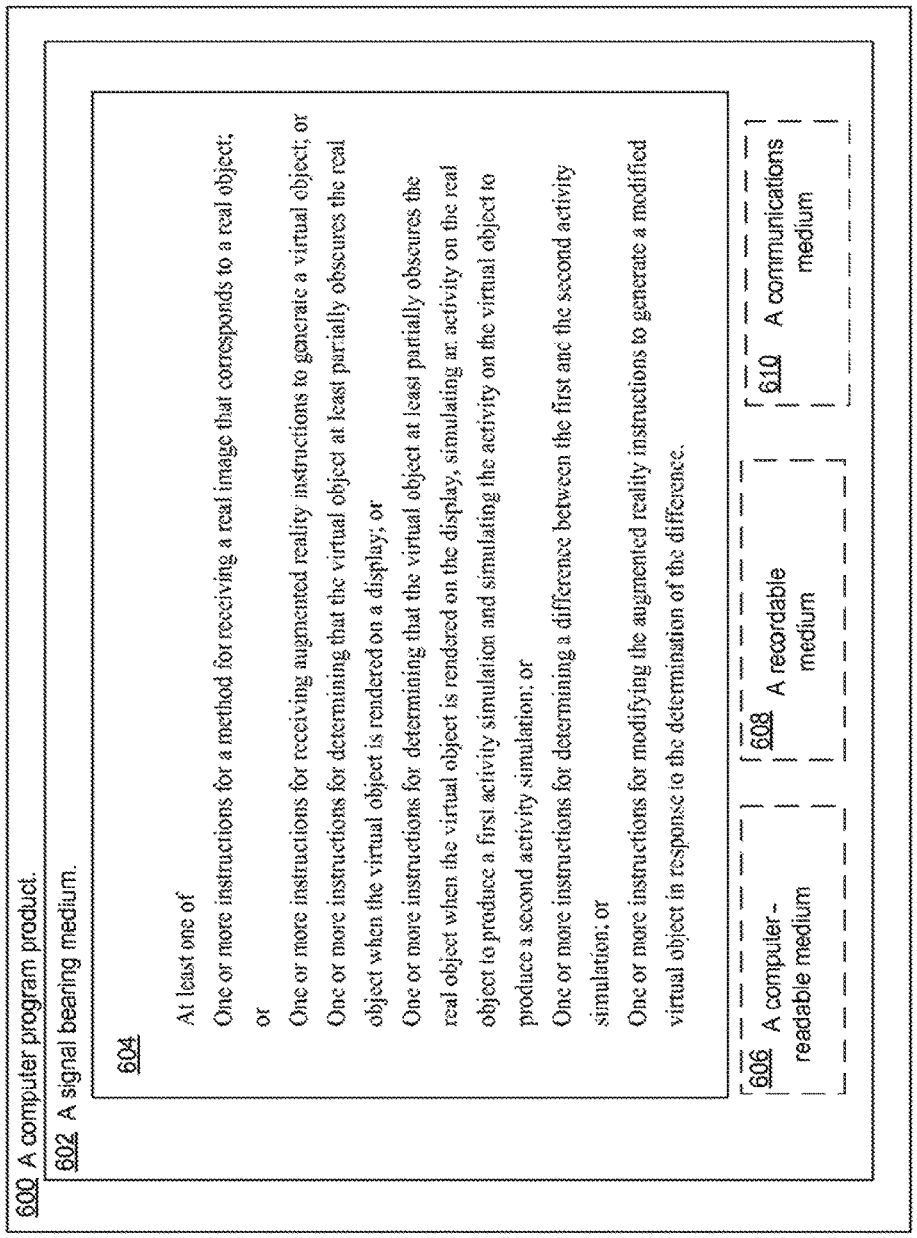
FIG. 6 illustrates a computer program product effective to implement an augmented reality alteration detector.

FIG. 6 illustrates a computer program product effective to implement an augmented reality alteration detector arranged in accordance with at least some embodiments presented herein. Computer program product 600 may include a signal bearing medium 602. Signal bearing medium 602 may include one or more instructions 604 that, when executed by, for example, a processor, may provide the functionality described above with respect to FIGS. 1-5. Thus, for example, referring to systems 100 or 200, processor 154 or 254 may undertake one or more of the blocks shown in FIG. 6 in response to instructions 604 conveyed to the systems 100 or 200 by signal bearing medium 602.

In some implementations, signal bearing medium 602 may encompass a computer-readable medium 606, such as, but not limited to, a hard disk driven (HDD), a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to one or more modules of the systems 100 or 200 by an RF signal bearing medium 602, where the signal bearing medium 602 is conveyed by a wireless communications medium 610 (e.g., a wireless communications medium conforming with the IEEE 802.11 standard).

FIG. 7 is a block diagram illustrating an example computing device 700 that is arranged to implement an augmented reality alteration detector arranged in accordance with at least some embodiments presented herein. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include an augmented reality alteration detector algorithm 726 that is arranged to perform the functions as described herein including those described previously with respect to FIGS. 1-6. Program data 724 may include augmented reality alteration detector data 728 that may be useful for implementing an augmented alteration detector as is described herein. In some embodiments, application 722 may be arranged to operate with program data 724 on operating system 720 such that an augmented reality alteration detector may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide travel directions, the method comprising:
   receiving a real image that corresponds to a real object;
   receiving augmented reality instructions to generate a virtual object;
   determining that the virtual object at least partially obscures the real object after the virtual object is rendered on a display;
   in response to a determination that the virtual object at least partially obscures the real object after the virtual object is rendered on the display:
   simulating an activity that relates to driving, in response to the real object, to produce first driving instructions when the virtual object is not generated by the augmented reality instructions, and
   simulating the activity, in response to the virtual object, to produce second driving instructions when the virtual object is generated by the augmented reality instructions;
   determining a difference between the first driving instructions and the second driving instructions; and
   modifying the augmented reality instructions to generate a modified virtual object in response to the determined difference.

2. The method of claim 1, wherein simulating the activity to produce the first driving instructions includes simulating the activity to produce driving instructions to avoid the real object.

3. The method of claim 1, wherein simulating the activity to produce the second driving instructions includes simulating the activity to produce driving instructions to follow the virtual object and pass through the real object.

4. The method of claim 1, wherein modifying the augmented reality instructions to generate the modified virtual object includes preventing the modified virtual object from obscuring the real object.

5. The method of claim 1, wherein modifying the augmented reality instructions to generate the modified virtual object includes emphasizing the real object in response to the modified virtual reality object being rendered on the display.

6. The method of claim 1, wherein modifying the augmented reality instructions includes inhibiting generation of the virtual object.

7. The method of claim 1, wherein modifying the augmented reality instructions is effective to at least one of:
decrease a size of the virtual object;
flash the virtual object;
modify the virtual object to be transparent; or
highlight the virtual object.

8. The method of claim 1, further comprising generating an audio alarm after the determination of the difference.

9. The method of claim 1, further comprising determining line of sight data, and wherein the determining the virtual object at least partially obscures the real object is based on the line of sight data.

10. The method of claim 1, further comprising:
displaying the virtual object before the determination of the difference; and
displaying the modified virtual object after the determination of the difference.

11. A device effective to provide travel directions, the device comprising:
a sensor effective to generate line of sight data for a viewer and transmit the generated line of sight data to a processor;
a camera effective to capture data that includes one or more real images which correspond to a real object;
a display; and
the processor configured to be in communication with the sensor, the camera, and the display, the processor effective to:
receive the line of sight data and the data;
receive augmented reality instructions to generate a virtual object;
determine that the virtual object at least partially obscures the real object based on the line of sight data after the virtual object is rendered on the display to the viewer;
in response to a determination that the virtual object at least partially obscures the real object after the virtual object is rendered on the display:
simulate an activity that relates to driving performed by the viewer, in response to the real object, to produce first driving instructions when the virtual object is not generated by the augmented reality instructions, and
simulate the activity, in response to the virtual object, to produce second driving instructions when the virtual object is generated by the augmented reality instructions;
determine a difference between the first driving instructions and the second driving instructions; and
modify the augmented reality instructions to generate a modified virtual object in response to the determined difference.

12. The device of claim 11, wherein the device includes one of augmented reality glasses or a portable screen augmented reality device.

13. The device of claim 11, wherein the processor is further effective to modify the augmented reality instructions to inhibit generation of the virtual object.

14. The device of claim 11, wherein the processor is further effective to generate an audio alarm after the determination of the difference.

15. A device effective to detect an alteration in augmented reality, the device comprising:
a camera effective to capture a real image that corresponds to a real object;
a display;
a memory comprising a library of objects; and
a processor configured to be in communication with the camera, the display, and the memory, the processor effective to:
receive the real image;
receive augmented reality instructions to generate a virtual object;
determine that the virtual object at least partially obscures the real object and that the real object corresponds to an object in the library; and
modify the augmented reality instructions to produce a modified virtual object in response to the determination, wherein the augmented reality instructions are modified so that the modified virtual reality object, when rendered, emphasizes the real object.

16. The device of claim 15, wherein the processor is further effective to modify the augmented reality instructions to inhibit generation of the virtual object.

17. The device of claim 15, wherein the processor is further effective to modify the augmented reality instructions to at least one of:
decrease a size of the virtual object;
flash the virtual object;
modify the virtual object to be transparent; or
highlight the virtual object.

18. The device of claim 15, wherein the display is effective to render the modified virtual object.

19. The device of claim 15, wherein the display is effective to render the real object.

20. The device of claim 15, wherein the library includes signs, food, or faces.

* * * * *